(12) United States Patent
Somerville

(10) Patent No.: US 9,249,677 B1
(45) Date of Patent: Feb. 2, 2016

(54) BLADE PITCH-CONTROLLED WIND TURBINE SYSTEM

(71) Applicant: Cristofer D. Somerville, Cooperstown, ND (US)

(72) Inventor: Cristofer D. Somerville, Cooperstown, ND (US)

( * ) Notice: Subject to any disclaimer, the term of this patent is extended or adjusted under 35 U.S.C. 154(b) by 452 days.

(21) Appl. No.: 13/774,015

(22) Filed: Feb. 22, 2013

(51) Int. Cl.
*F01D 5/18* (2006.01)
*F01D 7/00* (2006.01)
*F03D 7/02* (2006.01)
*F03D 1/00* (2006.01)

(52) U.S. Cl.
CPC . *F01D 7/00* (2013.01); *F03D 1/003* (2013.01); *F03D 7/0224* (2013.01)

(58) Field of Classification Search
USPC ............. 415/155, 156, 157 A; 416/1, 25, 147
See application file for complete search history.

(56) References Cited

U.S. PATENT DOCUMENTS 6,327,957 B1 * 12/2001 Carter, Sr. .......................... 91/41
6,441,507 B1 * 8/2002 Deering et al. .................. 290/44

* cited by examiner

*Primary Examiner* — Ching Chang
(74) *Attorney, Agent, or Firm* — Dave Alan Lingbeck

(57) ABSTRACT

A blade pitch-controlled wind turbine system for achieving maximum wind efficiency with variable speed and blade pitch control. The blade pitch-controlled wind turbine system includes a support assembly including a tower; a turbine rotor assembly being supported upon the support assembly; and a blade pitch control assembly being supported upon the support assembly and being in communication with the said turbine rotor assembly.

6 Claims, 3 Drawing Sheets

BLADE PITCH-CONTROLLED WIND TURBINE SYSTEM

BACKGROUND OF THE INVENTION

1. Field of the Invention

The present invention relates to wind turbines and more particularly pertains to a new blade pitch-controlled wind turbine system for achieving maximum wind efficiency with variable speed and blade pitch control.

2. Description of the Prior Art

The use of wind turbines is known in the prior art. More specifically, wind turbines heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a control system including a subtractor for generating a difference signal; a device for generating from the difference signal a first blade control signal greater than a minimum level, from a device for generating a second blade control signal greater than a minimum level, from first blade control signal and the difference signal; a device for generating a third blade control signal for adjusting the pitch of variable-pitch angle blades, from second blade control signal and power rate signal. Another prior art includes a wind power installation having a rotor with at least one blade and an adjusting device for the rotor blade. An adjusting device with more than one drive for one rotor blade is provided. By virtue of that arrangement each drive only has to furnish a corresponding fraction of the power output, it can be of a correspondingly smaller design configuration, and it imposes a correspondingly lower loading on the subsequent components.

Further, another prior art describes a redundant and fail-safe blade system of a wind turbine including at least one blade pitch drive and at least two power control modules for controlling the blade pitch drive. The power control modules are connected to the blade pitch drive by a switching unit which allows an alternative connection between the blade pitch drive and any of the power control modules. In operation, the blade pitch drive is controlled by only one of the power control modules. If a malfunction of the currently operating power control module is detected, switching unit provides a connection to the other power control module to allow an ongoing operation of the wind turbine without an unplanned or forced shut-down. Also, another prior art includes a wind turbine blade pitch system for moving the blades to control their pitch in the event of a power failure. The system includes at least one backup that has a non-electrical component that can pitch the blades in the event that the power failure adversely affects the electrical blade pitch actuator system. Embodiments include pitch systems that have a plurality of pitch driving systems including, but not limited to electrical systems, hybrid electrical/mechanical systems and non-electrical systems. The non-electrical systems include mechanical, pneumatic or hydraulic systems. While these devices fulfill their respective, particular objectives and requirements, the aforementioned patents do not disclose a new blade pitch-controlled wind turbine system.

SUMMARY OF THE INVENTION

The general purpose of the present invention, which will be described subsequently in greater detail, is to provide a new blade pitch-controlled wind turbine system which has many of the advantages of the wind turbines mentioned heretofore and many novel features that result in a new blade pitch-controlled wind turbine system which is not anticipated, rendered obvious, suggested, or even implied by any of the prior art wind turbines, either alone or in any combination thereof.

The present invention includes a support assembly including a tower; a turbine rotor assembly being supported upon the support assembly; and a blade pitch control assembly being supported upon the support assembly and being in communication with the said turbine rotor assembly. None of the prior art includes the combination of the elements of the present invention.

There has thus been outlined, rather broadly, the more important features of the blade pitch-controlled wind turbine system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new blade pitch-controlled wind turbine system which has many of the advantages of the wind turbines mentioned heretofore and many novel features that result in a new blade pitch-controlled wind turbine system which is not anticipated, rendered obvious, suggested, or even implied by any of the prior art wind turbines, either alone or in any combination thereof.

Still another object of the present invention is to provide a new blade pitch-controlled wind turbine system for achieving maximum wind efficiency with variable speed and blade pitch control.

Still yet another object of the present invention is to provide a new blade pitch-controlled wind turbine system that pitches the blades most effectively to capture the most wind energy possible.

Even still another object of the present invention is to provide a new blade pitch-controlled wind turbine system that passively brakes the wind turbine rotor without using electrical means thus resulting in less stress being put upon the wind turbine. Also, the passive braking of the blades operates independently of one another should any one of the blades become stuck in a certain position or pitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
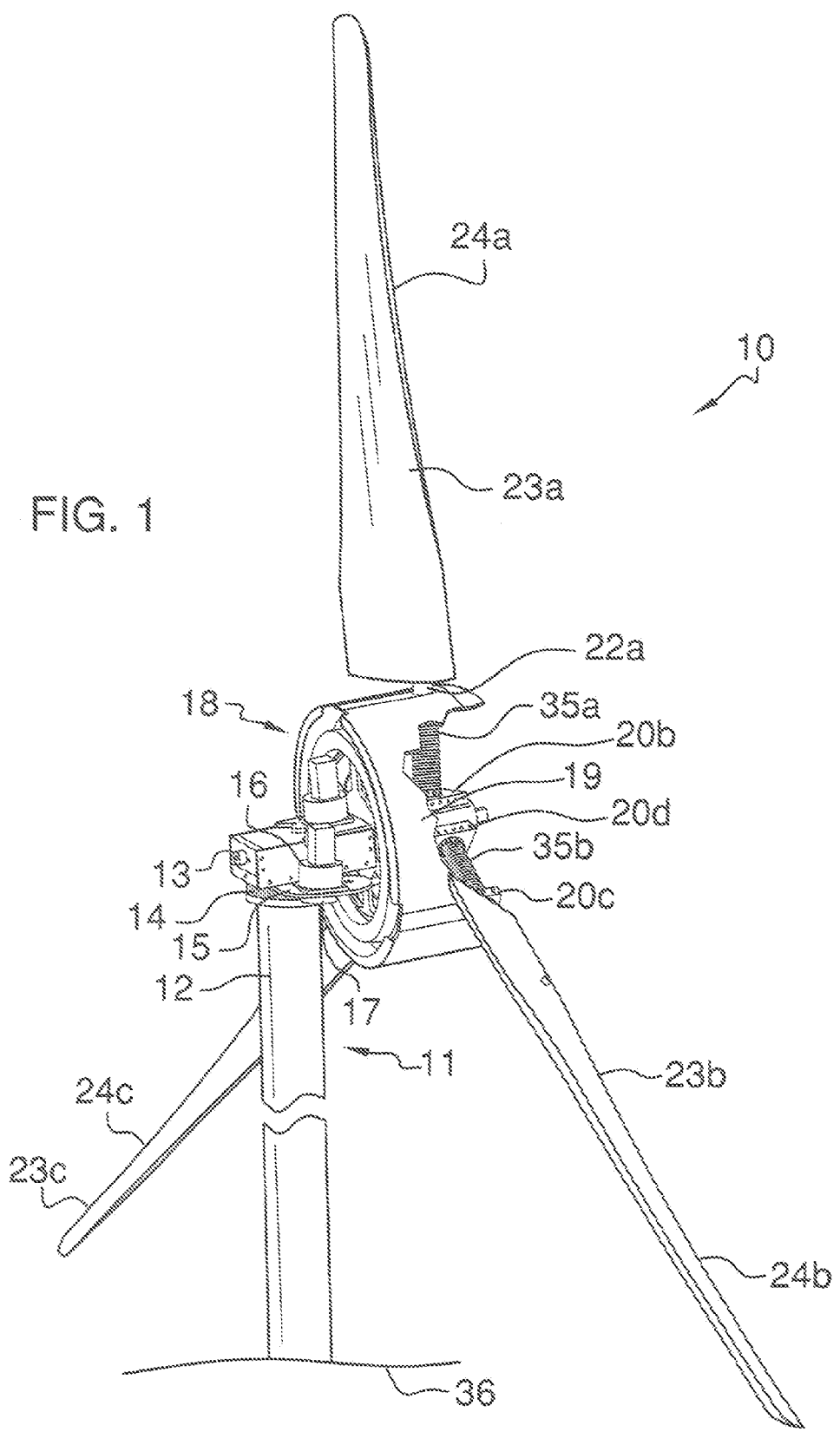
FIG. 1 is a perspective view of a new blade pitch-controlled wind turbine system according to the present invention.
Figure 2:
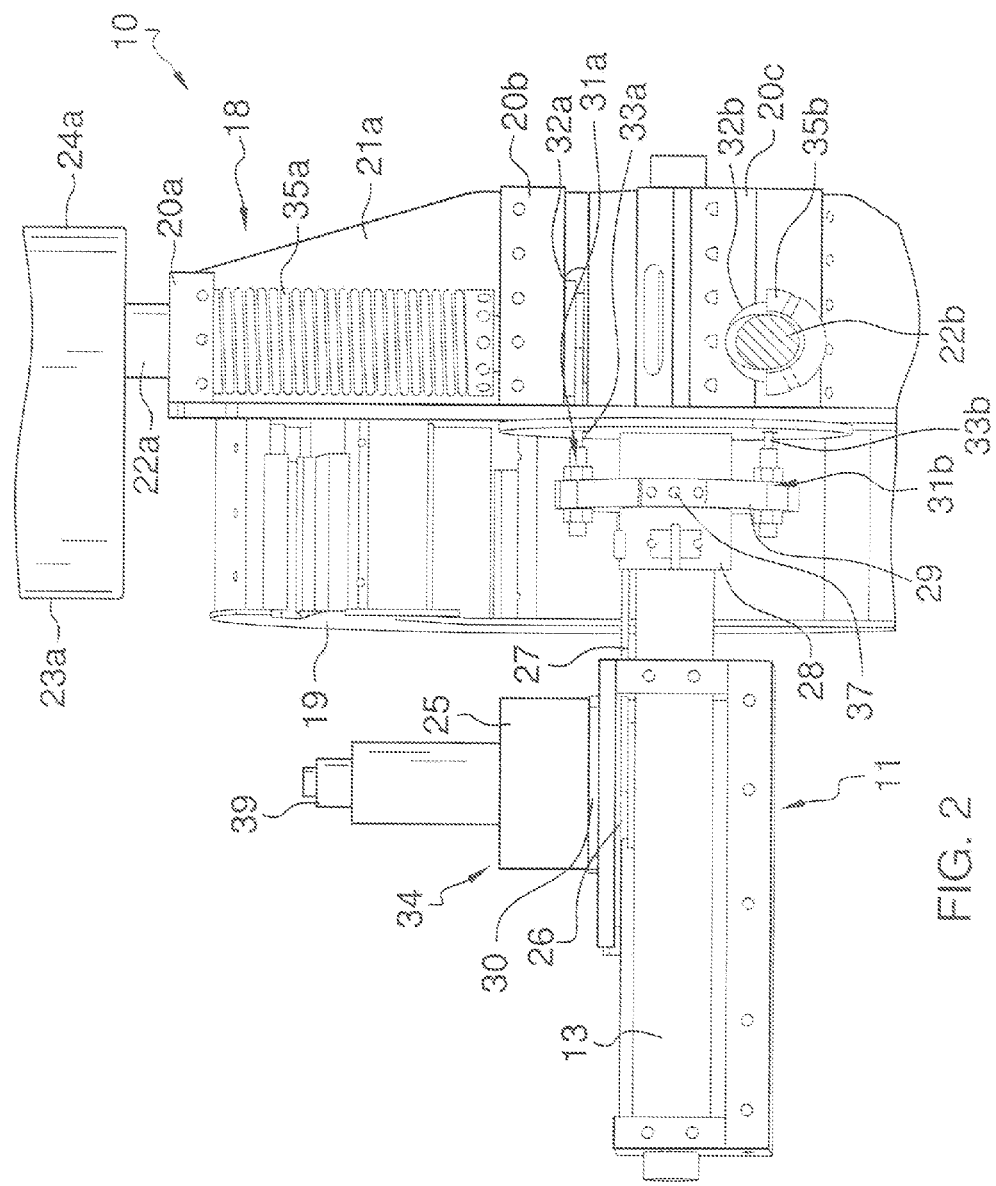
FIG. 2 is a cross-sectional elevational view of the present invention showing blades passively parked into a wind from a right.
Figure 3:
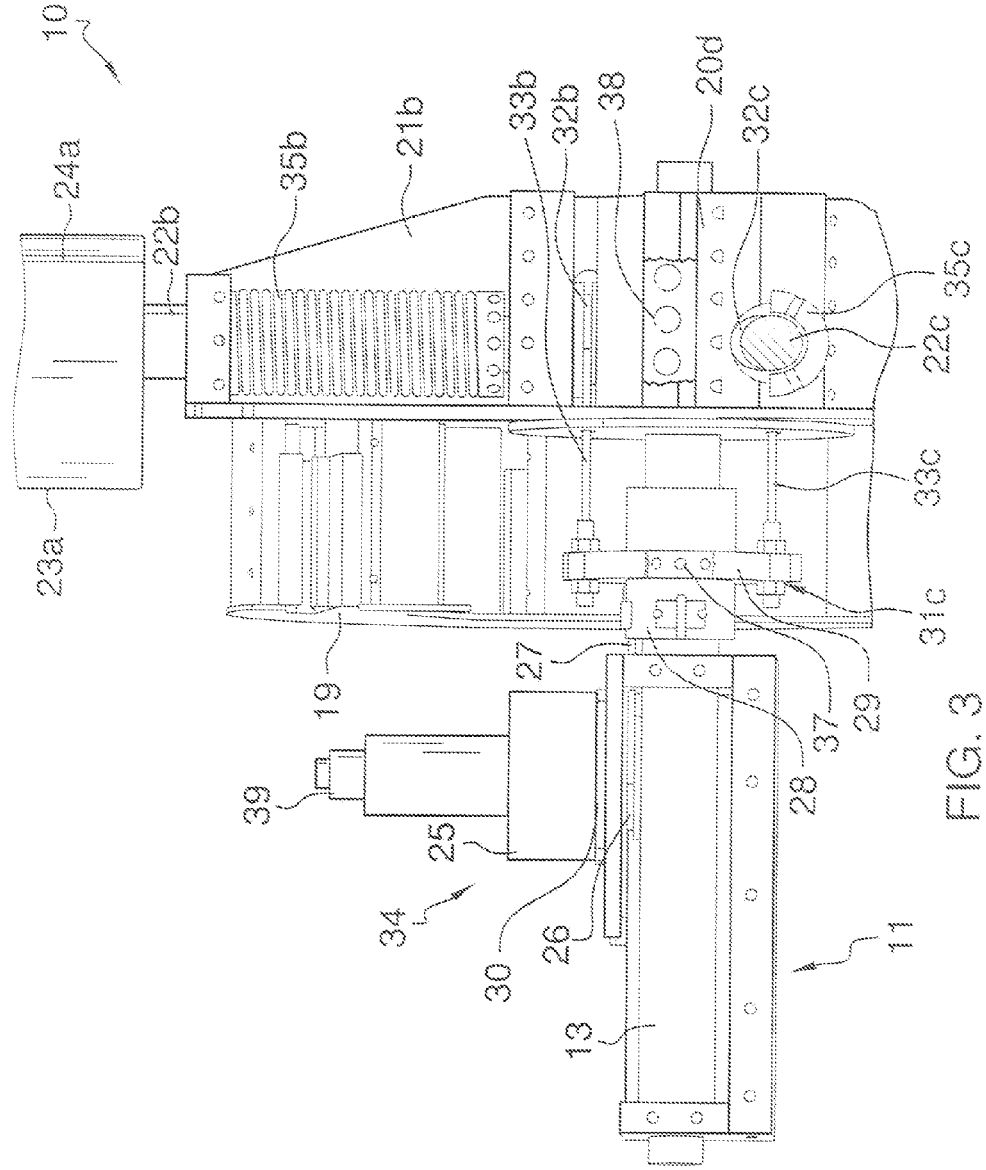
FIG. 3 is a cross-sectional elevational view of the present invention showing the blades to be actively pitched for capturing the mot efficient wind energy.

With reference now to the drawings, and in particular to FIGS. 1 through 3 thereof, a new blade pitch-controlled wind turbine system embodying the principles and concepts of the present invention and generally designated by the reference numeral 10 will be described.

As best illustrated in FIGS. 1 through 3, the blade pitch-controlled wind turbine system 10 generally comprises a support assembly 11 including a tower 12 being securely supported upon a ground 36. The support assembly 11 also includes an elongate support member 13 being conventionally supported upon the tower 12. The support assembly 11 further includes a geared bearing 14 being securely and conventionally disposed upon the tower 12, and also includes a turbine support member 15 being rotatably and conventionally mounted upon the geared bearing 14. The support assembly 12 further includes a yaw motor 16 having a motor shaft (not shown) being conventionally supported upon and attached to the turbine support member 15, and also includes a gear member 17 being rotatably and conventionally connected to the yaw motor 16 and being disposed below the turbine support member 15 and being engageable to the geared bearing 14 for selectively moving the turbine support member 15 upon the actuation thereof.

A turbine rotor assembly 18 is conventionally supported upon the support assembly 11. The turbine rotor assembly IS includes a hub member 19 having hub bearings 38 and being rotatably and conventionally disposed upon and about the elongate support member 13. The turbine rotor assembly 18 also includes blade support members 22a-c being rotatably and pivotally mounted to the hub member 19 and being spaced apart and extending radially therefrom. The hub member 19 includes brackets 20a-d being conventionally secured thereto with the blade support members 22a-c being rotatably disposed therethrough, and also includes braces 21a-b conventionally interconnecting to pairs of the brackets 20a-d. The turbine rotor assembly 18 further includes blades 23a-c each being conventionally disposed upon and about a respective blade support member 22a-c and each having a leading edge 24a-c. Each of the blade support members 22a-c is rotatable about its longitudinal axis.

A blade pitch control assembly 34 is supported upon the support assembly 11 and is in communication with the turbine rotor assembly 18. The blade pitch control assembly 34 includes blade park members 35a-c which are preferably biased members such as springs each being conventionally disposed about a respective blade support member 22a-c for urging each blade 23a-c into a park position to generally prevent rotation of the hub member 19 with the leading edges 24a-c of the blades 23a-c substantially facing into a wind when in use. The blade park members 35a-c could also include hydraulic accumulators and hydraulic cylinders.

The blade pitch control assembly 34 also includes an actuator 25 such as a motor being securely and conventionally mounted upon the elongate support member 13 and being in communication with the blades 23a-c and having an rotatable member 30 such as a rotational shaft for rotating the blades 23a-c, and also a conventional brake mechanism 39 being conventionally mounted upon the actuator 25 and including a friction member (not shown) and a spring (not shown) and being in communication with the actuator 25 to prevent movement such as rotation of the actuating member 30, and further includes a first carrier member 26 which preferably is a pulley but could also be an arm being conventionally connected and bolted to the rotatable member 30 for linear or rotational movement therewith. The blade pitch control assembly 3 also includes an interconnecting member 28 which is preferably a sleeve being in communication with the actuator 25 and being movably and slidably disposed and conventionally retained upon and about the elongate support member 13 and also having an annular recess disposed thereabout.

The blade pitch control assembly 34 further includes first and second linkage members 27, 33a-c which are preferably cable members but could also include rigid linkages with the first linkage member 27 being fastened to the outer surface of the interconnecting member 28 using fasteners and being conventionally carried by the first carrier member 26 for moving the interconnecting member 28 linearly along the elongate support member 13. The blade pitch control assembly 34 further includes a rotatable member 29 such as a collar having a bearing member 37 and being rotatably and conventionally retained by the annular recess about the interconnecting member 28 for rotation with the hub member 19. The blade pitch control assembly 34 also includes second carrier members 32a-c which are preferably pulleys each of which is in communication with and conventionally connected and bolted to a respective blade support member 22a-c for pivoting the blade support members 22a-c. The second linkage members 33a-c are conventionally carried by the second carrier members 32a-c and are fastened to the rotatable member 29 for selectively pivoting the blades 23a-c to a desired pitch relative to the wind direction when in use. The rotatable member 29 has holes 31a-c being circumferentially spaced apart and being disposed therethrough for receiving and securing portions of the second linkage members 33a-c using fastening members.

In use, the pitches of the blades 23a-c are adjusted according to wind velocity and direction to capture the most efficient wind energy for rotating the turbine rotor assembly 18. Preferably, an instrument such as a sensor (not shown) measures the wind direction and wind velocity and communicates this information to a processor (not shown) which is in conventional communication with the sensor and which is also in conventional communication with a power source (not shown) and is in further conventional communication with the actuator 25 and the brake mechanism 39. In response to the sensor, the processor effectively energizes the actuator 25 which moves the interconnecting member 28 via the first carrier member 26 and the first linkage member 27, upon the elongate support member 13 relative to the turbine rotor assembly 18 to rotate the blades 23a-c relative to the wind direction to effectively capture the most efficient wind energy. Once the optimal pitches of the blades 23a-c have been set, the processor energizes the brake mechanism 39 with the friction member (not shown) effectively and conventionally engaging the rotatable member 30 of the actuator 25 to prevent movement of the rotatable member 30 and to prevent movement of the interconnecting member 28 by the blade park members 35a-c. The blades 23a-c can be effectively parked automatically without using the actuator 25 to generally prevent the rotation of the turbine rotor assembly 18. The blades 23a-c are parked upon the processor de-energizing the brake mechanism 39 which allows the rotatable member 30 to freely move and the blade park members 35a-c to independently bias the blades 23a-c and face the leading edges 24a-c of the blades 23a-c into the wind thus effectively preventing the wind from impacting the blades 23a-c and rotating the hub member 19.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the blade pitch-controlled wind turbine system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A blade pitch-controlled wind turbine system comprising:
   a support assembly including a tower, wherein said support assembly also includes an elongate support member supported upon said tower;
   a turbine rotor assembly supported upon said support assembly, wherein said turbine rotor assembly includes a hub member rotatably disposed upon said elongate support member, wherein said turbine rotor assembly also includes blade support members rotatably and pivotally mounted to said hub member, wherein said turbine rotor assembly further includes blades each disposed upon a respective said blade support member; and
   a blade pitch control assembly supported upon said support assembly and in communication with said turbine rotor assembly, wherein said blade pitch control assembly also includes an actuator having a rotatable member and being in communication with said blade support members for adjusting a pitch of said blades relative to the wind, and also includes a brake mechanism being in communication with said rotatable member to effectively brake said rotatable member with said blades being at selected stationary pitches.

2. The blade pitch-controlled wind turbine system as described in claim 1, wherein said blade pitch control assembly further includes an interconnecting member being in operable communication with said rotatable member and said blade support members, and also includes a rotatable member being rotatably and securely disposed about said interconnecting member and being in operable communication with said blade support members and being in rotatable communication with said hub member.

3. The blade pitch-controlled wind turbine system as described in claim 2, wherein said blade pitch control assembly also includes first and second linkage members with said first linkage member being in operable communication with said rotatable member and being connected to said interconnecting member to facilitate the pitch adjustment of said blades, and said second linkage members each being connected to said rotatable member and being in operable communication with said blade support members for rotating and adjusting said blades.

4. The blade pitch-controlled wind turbine system as described in claim 3, wherein said first and second linkage members are cable members.

5. The blade pitch-controlled wind turbine system as described in claim 3, wherein said blade pitch control assembly further includes first and second carrier members with said first carrier member being in operable communication with said rotatable member and with said second carrier members being in operable communication with said blade support members, said first linkage member being carried by said first carrier member and each said second linkage member being carried by a respective said second carrier member, said first and second carrier members being pulleys.

6. The blade pitch-controlled wind turbine system as described in claim 1, wherein said interconnecting member is a sleeve being movably supported upon said elongate support member to facilitate blade pitch adjustment.

* * * * *